United States Patent [19]
Johnson

[11] Patent Number: 4,676,266
[45] Date of Patent: Jun. 30, 1987

[54] PRESSURE RELIEF DEVICE
[75] Inventor: Wendell D. Johnson, Rochester, N.Y.
[73] Assignee: Qualitrol Corporation, Fairport, N.Y.
[21] Appl. No.: 337,731
[22] Filed: Jan. 7, 1982
[51] Int. Cl.⁴ .......................................... F16K 25/00
[52] U.S. Cl. .............................. 137/242; 134/516.25; 134/469; 174/11 R
[58] Field of Search ................. 137/516.25, 242, 469; 220/357, 358; 277/177; 251/333, 360, 364; 174/11 R

[56] References Cited
U.S. PATENT DOCUMENTS 2,130,651  9/1938  Phillips ........................... 220/357
2,328,805  9/1943  Holthouse ........................ 251/333
2,645,449  7/1953  Gulick ............................. 251/360
3,217,082  11/1965 King et al. ..................... 137/469 X
3,347,555  10/1967 Norton ........................... 277/177

Primary Examiner—Alan Cohan
Assistant Examiner—John A. Rivell
Attorney, Agent, or Firm—S. J. Rudy; C. L. Johnson, Jr.

[57] ABSTRACT

An improvement in a pressure relief device of the type used in a power transformer, the improvement consisting of a flat circular gasket fixedly mounted about its inner periphery, and having its outer periphery flexibly arranged for wiping contact with the inner surface of a cup-like valve member.

3 Claims, 3 Drawing Figures

PRESSURE RELIEF DEVICE

PRESSURE RELIEF DEVICE

This invention relates to an improvement in a pressure relief device of the type which is used on a power transformer.

U.S. Pat. No. 3,217,082 issued Nov. 9, 1968, is the type of pressure relief device in which the subject invention may be incorporated to improve operational characterisitics. The device of said patent utilizes a circular gasket (27) which provides a pressure tight seal when the valve used in the device is in closed or seated position. Because dimensional tolerances of the gasket and the groove in which it is postioned, may be difficult to accurately establish, coupled with variation in the durometer factor of the gasket, such a sealing arrangement can result in erratic operational performance of the device.

The main object of the subject invention is to provide an improvement in operational performance of a pressure relief device which incorporates the subject invention.

A more specific object is to provide an improvement in a gasket seal arrangement used in a pressure relief device, which gasket seal arrangement avoids the shortcomings of prior art gasket seal arrangements designed for similar purposes.

These and further objects and features of the invention will become evident from the disclosure set forth herein.

Figure 1:
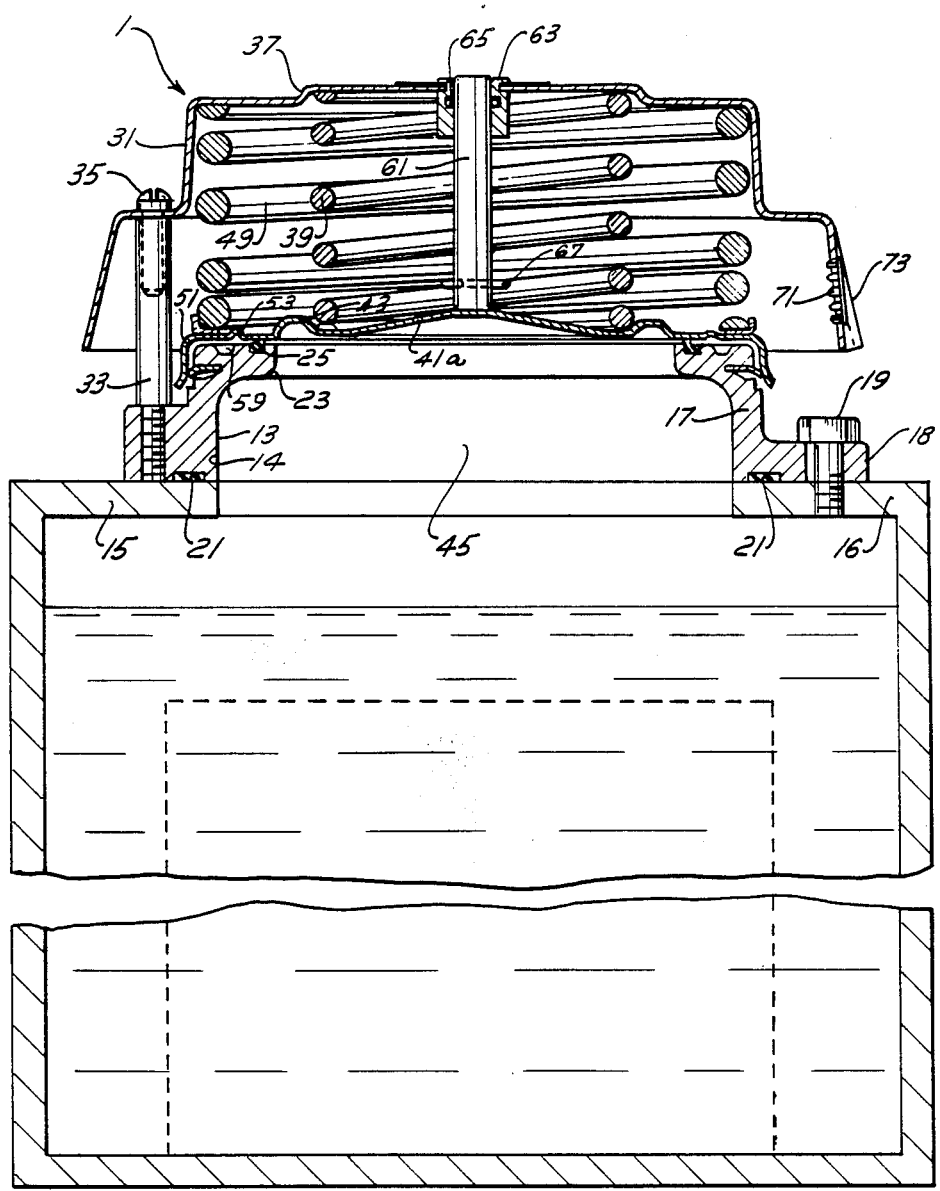
FIG. 1 is a vertical cross-section view of a pressure relief device of the invention shown mounted upon an enclosed container of a power transformer.

Referring now to the drawings, numeral 1 identifies a pressure relief device incorporating the invention, which device is similar in all respects—except for the subject invention—as the FIG. 9 embodiment disclosed in U.S. Pat. No. 3,217,082, which is incorporated by reference in its entirety herein.

So as to avoid repetition, part identification numbers used in U.S. Pat. No. 3,217,082, will be used for equivalent parts in this disclosure, without a description of such parts insofar as they are described in detail in the referred to patent.

The primary difference between the device of this invention vis-a-vis that of U.S. Pat. No. 3,217,082, is in the outer sealing gasket. As seen in the patent, a sealing gasket in the form of an "O" ring (27) is used in the device of said patent.

In the subject invention a sealing gasket 3 is used, which has a different configuration as well as operating characteristics in comparison with the "O" ring gasket (27).

Figure 2:
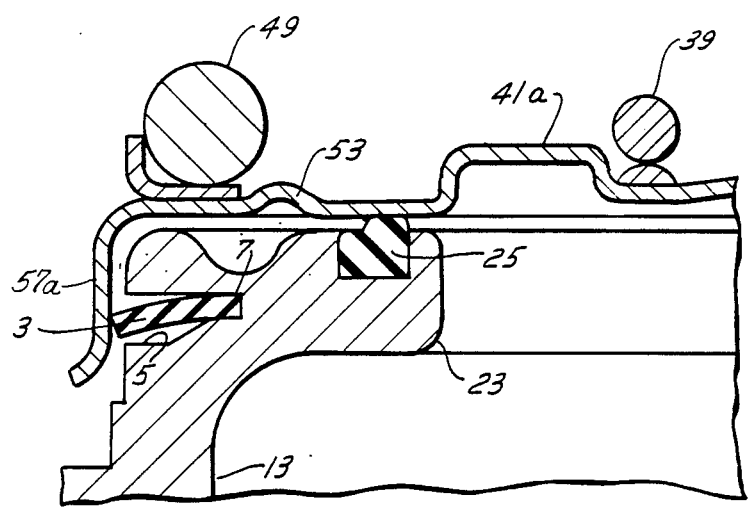
FIG. 2 is an enlarged partial section view of a sealing arrangement incorporating the invention, showing a valve of the device in closed position.
Figure 3:
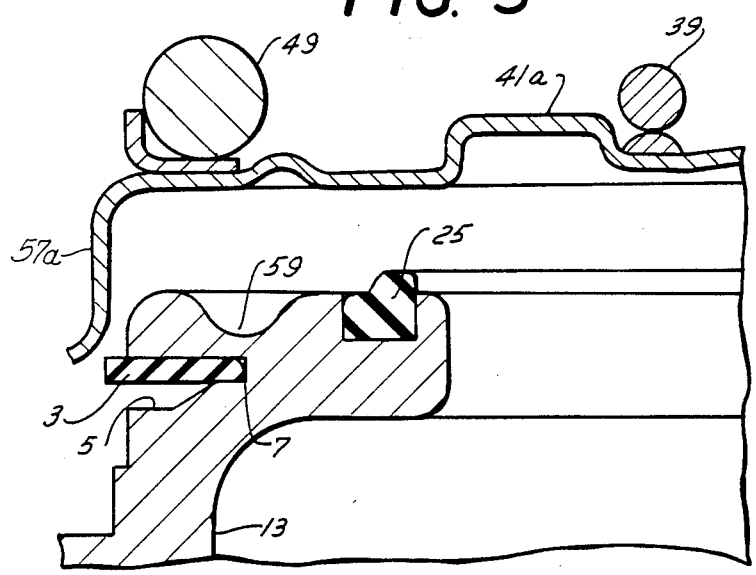
FIG. 3 is the same but showing the valve in open, or operative position.

As best seen in FIGS. 2 and 3, gasket 3 is flat, similar to a sealing gasket used for many years in Mason type glass canning jars. The gasket 3 is positioned in a recess 5 of the level ring 23, an upper surface of the recess being flat, while the width of the outer region of the recess is greater than the thickness of gasket 3. The gasket may be formed of rubber or any conventional gasket material.

The inner edge of the gasket is maintained in a circumferential groove 7 formed in the recess 5. The outer periphery of the gasket projects beyond the wall of the level ring 23 where it is subject to contact by the main closure member 41a, to provide "wind shield wiper" action for maintaining pressure between the closure member and the level ring 23 as the closure member is moved upwardly out of contact with the gasket 25. It will be noted that the gasket will allow less resistance to downward movement or closing of the closure member 41a than upward or opening movement of said member. Accordingly, the gasket arrangement affords improved sealing and quick resealing advantages.

The design of gasket 3 is such that certain factors i.e., dimensional tolerances, compounding, durometer rating, have no effect on the performance of the device on rising pressure. In the ring gasket 27 of U.S. Pat. No. 3,217,082, all of such factors, unless accurately controlled, can result in erractic operational performance of the device of the patent.

The gasket arrangement of the present invention thus results, not only in improved operating performance, but in lower manufacturing costs, with reduction of rejects and minimization of product quality control.

What is claimed is:

1. The combination with a housing (16) for hermetically isolating electrical apparatus, of a pressure relief valve comprising a tubular base (13) mounted in surrounding and sealing relationship to a circular aperture (14) formed in the housing, the base (13) having an opening (23) leading into the housing (16), a circular gasket (25) positioned on the tubular base adjacent the base opening (23), a light spring (39), a disk valve (41a) biased into engagement with the gasket by the light spring for closing the opening (23), a heavy spring (49) surrounding the light spring and engaging the disk valve, a cap (31) secured to the tubular base (13) by fastening means (33) and arranged to maintained the light spring (39) and the heavy spring (49) in compressive engagement with the disk valve (41a), the disk being formed with a depending flange (57a) extending about the periphery of the tubular base (13) with the lower end of the flange being open to atmosphere, and a sealing gasket (3) positioned in a recess (5) formed about the periphery of the tubular base (13), the sealing gasket being flat and having a flexible end portion arranged for wiping engagement with an inner surface of the depending flange (57a).

2. A combination according to claim 1, wherein the tubular base (13) is formed with an annular recess (59), said annular recess together with the gasket (25) the sealing gasket (3) and the depending flange (57a) defining a pressure chamber to receive pressurized medium which moves past the gasket (25) as the disk valve (41a) is moved therefrom whereby the disk valve is totally exposed to pressurized medium acting to unseat it for quick release of excess pressure in the housing (16).

3. A combination according to claim 2, wherein the width of the outer region of the gasket recess (5) is greater than the thickness of the flat gasket (3).

* * * * *